United States Patent [19]

Nilberg

[11] 4,175,910
[45] Nov. 27, 1979

[54] WINDMOTOR AS A WINDBREAK

[76] Inventor: Reinhold H. Nilberg, 463 Beachview Dr., N. Vancouver, Canada, V7G 1P5

[21] Appl. No.: 757,763

[22] Filed: Jan. 7, 1977

[51] Int. Cl.² ............................................. F03D 5/02
[52] U.S. Cl. .......................................... 416/8; 415/5
[58] Field of Search ............................. 416/8.7; 415/5

[56] References Cited

U.S. PATENT DOCUMENTS

| | | | |
|---|---|---|---|
| 443,641 | 12/1890 | Eastman | 416/8 |
| 1,049,724 | 1/1913 | Johnson | 416/8 |
| 1,292,389 | 1/1919 | Cook | 416/8 |
| 1,526,631 | 2/1925 | Fagan | 416/8 |
| 3,730,643 | 5/1973 | Davison | 416/8 |

FOREIGN PATENT DOCUMENTS

| | | | |
|---|---|---|---|
| 462145 | 12/1949 | Canada | 415/5 |
| 2152637 | 4/1973 | Fed. Rep. of Germany | 415/5 |
| 975126 | 3/1951 | France | 416/8 |
| 984581 | 7/1951 | France | 416/8 |

*Primary Examiner*—Everette A. Powell, Jr.

[57] ABSTRACT

This invention relates to a windmotor as a windbreak fence. The windmotor serves as a shelter from the wind by converting part of the windenergy into useful energy and part of it into whirling movements. The windmotor looks similar to a conveyor as used for a skier's chairlift. The chairlift has one closed cable, with chairs attached, running from the one end to the other end of the lift. The conveyor type windmotor has additionally another cable running at a lower level parallel to the upper cable. Both cables run at the same velocity in same direction over a pair of wheels at each end of the windmotor. Upper and lower cables, on windside and leeside, are interconnected by a number of vanes in such a manner that the wind blowing on these vanes will force the windside cables with the vanes to move in one direction and the leeside cables with the vanes in the opposite direction, whereby generating a rotational movement of the wheels. When a vane goes over a pair of wheels then the vane will change automatically the pitch angle to the cable from windside pitch to leeside pitch and vice versa. In areas where strong unidirectional winds predominate, the new windmotor has the dual purpose of being a windbreak fence and a source of useful energy.

1 Claim, 4 Drawing Figures

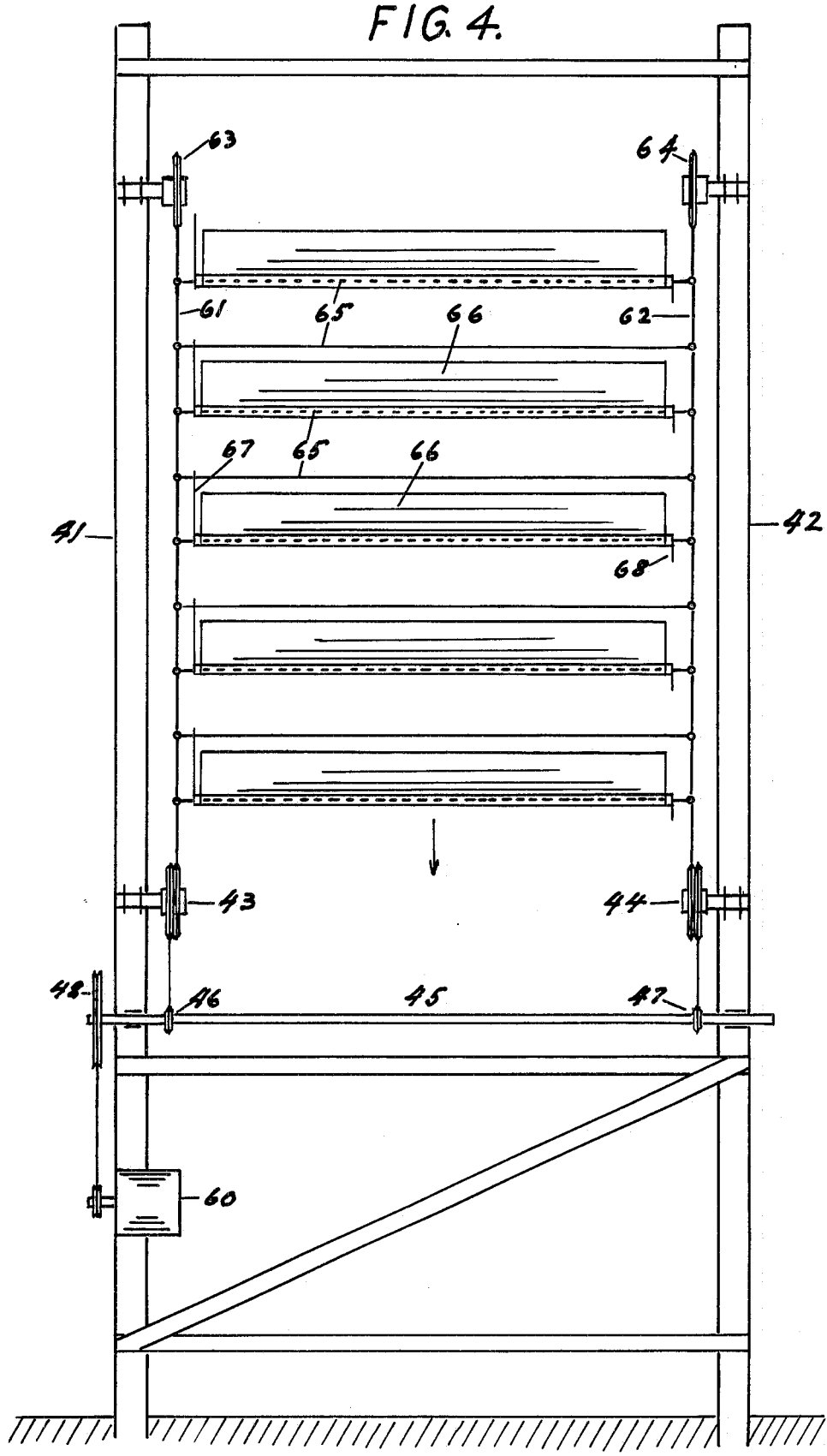

WINDMOTOR AS A WINDBREAK

A windbreak has been defined as "a growth of trees, a structure of boards, or the like, serving as a shelter from the wind". A growth of trees is being regarded as the most effective windbreak. It takes many years to grow a shelter belt of trees and in arid areas such a shelter belt is either very difficult to grow or impossible. A structure of boards as a windbreak is quite common. The wind looses very little of its energy when "it veers up and down the other side of a solid fence with unbated force", only a fence with gaps between the boards will break up part of the wind into whirling movements or vortices, reducing the unidirectional part of the wind velocity, but not much the total energy in the wind.

This disclosure describes a windmotor operating primarily as a windbreak near the ground level, e.g. for protecting the yard of a house and secondarily as a source of energy, e.g. for electrical preheating of water for a propane water heater.

A windmotor, when properly loaded, will reduce substantially the velocity and energy of the wind and additionally generate vortices. A windmotor can be an effective windbreak if designed and constructed for this purpose.

There are many types of windmotors and all of them are designed to operate as high as possible from the ground level because of substantial increase in wind velocity with the height. These windmotors have the purpose to transfer windenergy into a usable form of energy such as electrical or mechanical energy. None of them was developed to be primarily a windbreak fence at ground level in areas where strong ground winds are prevailing.

The windmotor as a windbreak looks similar to a conveyor as used for a skier's chairlift. The chairlift has one closed cable, with chairs attached, running over wheels from the one end to the other end of the lift. The conveyor type windmotor has additionally another cable running at a lower level parallel to the upper cable. Both cables run at the same velocity in same direction over a pair of wheels at each end of the windmotor. One pair of wheels, at one end of the motor, has a common shaft for synchronizing the motion of cables and wheels. Upper and lower cables, on windside and leeside, are interconnected by a number of vanes in such a manner that the wind blowing on these vanes will force the windside vanes with the cables to move in one direction and the leeside vanes with the cables in the opposite direction, whereby generating rotational movement of the wheels. When a vane goes over a pair of wheels then the surface of the vane will change automatically the pitch angle to the cable from windside pitch to leeside pitch and vice versa.

The combination of vanes and cables may be called a belt of vanes and the windmotor may be called a belt conveyor type windmotor. Because of aerodynamic considerations this wind motor must be designed as a "low speed windmotor". A low speed windmotor is best represented by the American multivane windturbine used for pumping of water. This low speed windmotor runs at tip speeds of the vane at about wind velocity, it has high torque and starting forces but low efficiency because the vanes are designed to deflect the wind sharply in the opposite direction of their movement and the energy in this deflected component of the windvelocity, behind the motor, is lost energy.

A "high speed windmotor" has only a few propeller type blades and runs at tip speeds of the blade at about five times windvelocity or more, it has low torque and starting forces but good efficiency because the deflected component of the wind behind the motor is very small.

An "ideal windmotor" with the right load and facing the wind at a right angle, has the maximum possible efficiency of 16/27 of the windenergy passing through the surface of the motor if the motor were removed. The windvelocity and direction closely behind the ideal windmotor are the same as closely before the motor. This motor is converting fully the pressure difference, before and behind the surface of the motor, into useful energy.

The belt of vanes of the new low speed belt conveyor type windmotor has the vanes on the windside of the belt, or the inflow vanes, running in one direction and the vanes on the leeside of the belt, or the outflow vanes, running in the opposite direction. This movement of vanes in opposing directions makes it possible to calculate the pitch of inflow vanes, the pitch of outflow vanes, the width of vanes and the distance between vanes in such a manner that the windenergy in the deflected component of windvelocity, right behind the windside part of the belt, is being taken up by the vanes of the leeside part of the belt, so that the wind right behind the leeside belt has again the same direction and velocity as the wind right before the windside belt. The efficiency of this low speed belt conveyor type windmotor is theoretically the same as for a high speed propeller type windmotor, additionally the new windmotor has good torque and starting forces as common for low speed windmotors.

The belt of the belt conveyor type windmotor may be horizontal, sloped, or vertical. This disclosure describes a motor with partially horizontal and partially sloped movement of the belt and also a motor with vertical movement of the belt. The new windmotor may be designed to turn automatically, the surface of the belt of vanes, perpendicular to the wind direction, however as a windbreak fence of some length (e.g. 100 feet) the windmotor should be stationary and the belt surface with vanes should be closely perpendicular to the prevailing wind direction or the direction should not exceed 45°.

If the wind blows from the opposite direction then the leeside of the belt becomes windside, but the motor will neither change direction of rotation nor will the pitch control mechanism require readjustments. In a storm the surface of the vane will turn itself parallel to the wind. This safety feature is an integral part of the means for pitch control of vanes.

The belt conveyor type motor is not restricted to air only as a moving fluid for transfer of energy from fluid to the belt of vanes, the disclosed motor will also run in moving water such as tidal currents.

In drawings which illustrate the embodiments of the invention:

FIG. 4 is a windside view of a belt conveyor type windmotor, with the belt moving in vertical direction.

Figure 1:
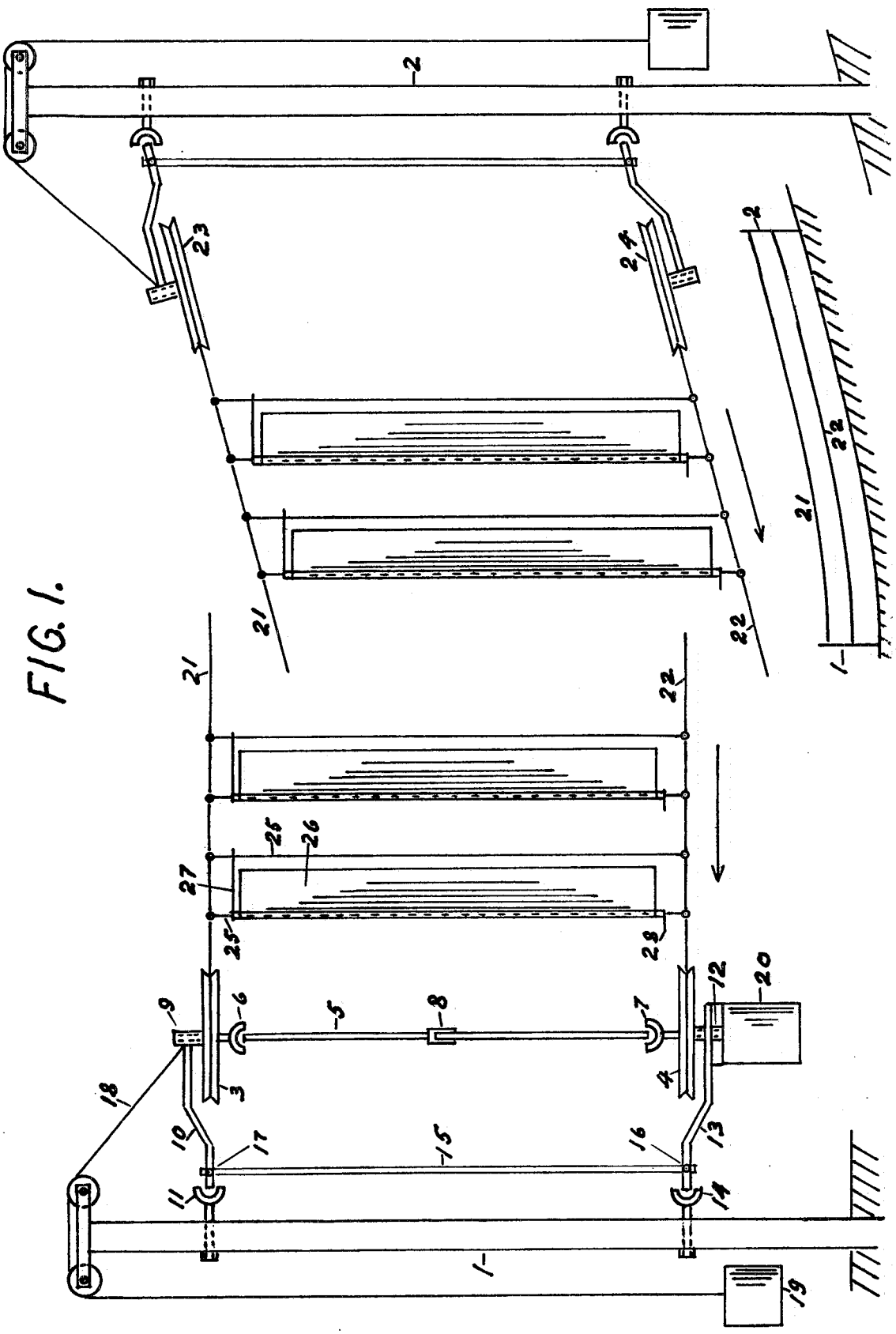
FIG. 1 is a windside view of a belt conveyor type windmotor, with part of the belt moving in horizontal and part of the belt moving in sloped direction.

In FIG. 1 the windmotor is mounted between posts 1 and 2. Post 1 is supporting a pair of wheels 3 and 4 connected by a synchronizing shaft 5 with universal joints 6 and 7 at the ends and an expansion coupling 8 in the middle. Wheel 3 is attached to post 1 by means of bearing 9, arm 10 and universal joint 11. Wheel 4 is attached to post 1 by means of bearing 12, arm 13 and universal joint 14. Link rod 15, with pivots 16 and 17, keeps the wheels 3 and 4 in parallel. Counterweight 19 and rope 18 are balancing the wheels 3 and 4 with attachments, generator 20 with gearing and cables 21 and 22 with vanes. In FIG. 1 cables 21 and 22 are running from right to left from wheels 23 and 24 to wheels 3 and 4. Rods 25 are pivoted to cables 21 and 22 in a similar manner as the chairs of a chairlift. Each second rod 25 carries a vane 26 turnable around rod 25, this turning of a vane is controlled on the windside by a pitch control arm 27 and on the leeside by a pitch control arm 28. In FIG. 1 arm 28 is nearly perpendicular to the surface of the drawing and not effective on the windside.

Figure 2:
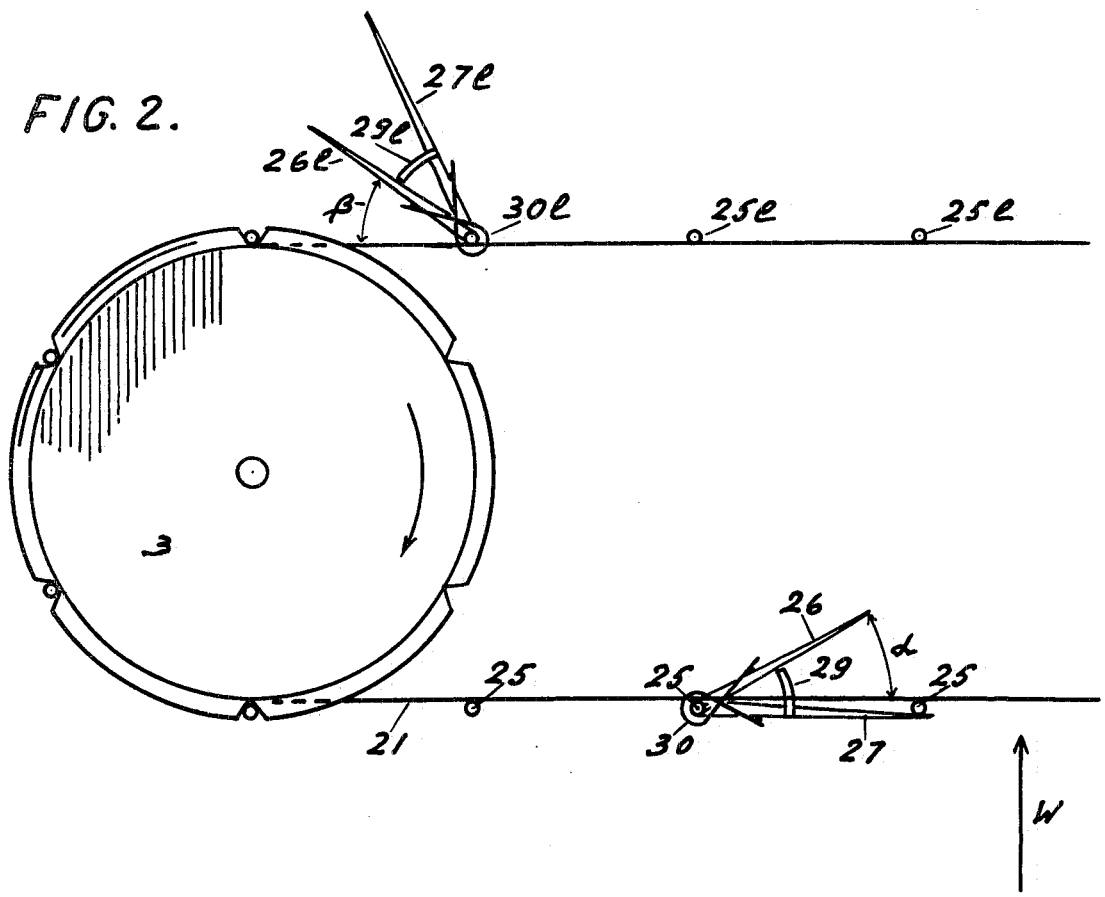
FIG. 2 is an enlarged top view of the upper wheel on the left side of FIG. 1.

FIG. 2 is the top view of the upper wheel 3 in FIG. 1 and also the top view of the upper end of windside vane 26 with pitch control arm 27. Pitch control arm 27 and vane 26 are separately turnable on rod 25. Arm 27 and vane 26 are held in fixed mutual position by means of an adjustable spacer 29, attached to arm 27, and a spring 30. With the wind blowing in direction of the arrow W on vane 26, the tip of arm 27 is forced to stay on stopper rod 25 keeping vane 26 at the pitch angle $\alpha$. In a storm the wind force on vane 26 will overcome spring action 30 and turn vane 26 parallel to the wind. Pitch control arm 27 in FIG. 2 becomes ineffective when vane 26 and arm 27 have passed over wheel 3, in direction shown on the wheel, into the leeside positions shown by 26-1 and 27-1. The pitch of vane 26-1 is now controlled by arm 28-1 in FIG. 3.

Figure 3:
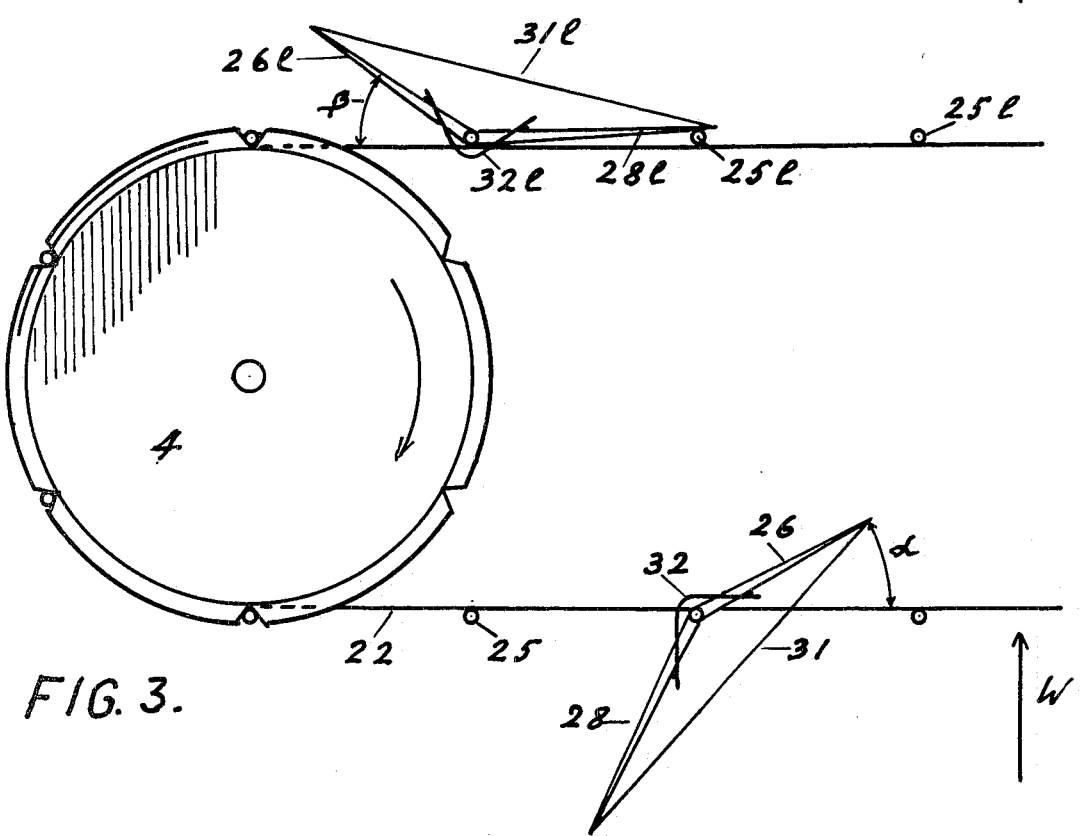
FIG. 3 is an enlarged top view of the lower wheel on the left side of FIG. 1.

FIG. 3 is the top view of the lower wheel 4 in FIG. 1 and also the top view of the lower end of windside vane 26 and leeside pitch control arm 28. The leeside pitch control arm 28 is not effective on the windside, it becomes effective in controlling the pitch of vane 26 when vane 26 and arm 28 have passed over wheel 4, in direction shown on the wheel, into the leeside positions shown by 26-1 and 28-1. Arm 28-1 and vane 26-1 are separately turnable on rod 25-1. Arm 28-1 and vane 26-1 are held in fixed mutual position by means of an adjustable spacer chain 31-1 and spring 32-1. With the wind blowing in direction of the arrow W on vane 26-1, the tip of arm 28-1 is forced to stay on stopper rod 25-1 keeping vane 26-1 at pitch angle $\beta$. In a storm the wind force on vane 26-1 will overcome spring action 32-1 and turn the vane 26-1 parallel to the wind. Wheels 3 and 4 are notched sheaves of variable diameter to ensure synchronization by preventing shifting of the cable in the groove and by compensating for elongation of the cable.

In FIG. 4 the belt conveyor type windmotor is mounted between posts 41 and 42. Post 41 carries at the lower end a pair of sprocket wheels 43 on a common hub and in horizontal direction, exactly on the opposite side, an identical pair of sprocket wheels 44. Wheels 43 and 44 are synchronized by the synchronizing shaft 45. Shaft 45 has at each end small sprockets 46 and 47 connected to sprockets 43 and 44 by corresponding roller chains. Shaft 45 has also on the left end a sheave 48 belted to a generator 60. A separate synchronizing shaft 45, outside of the belt of vanes, makes a shaft between sprockets 43 and 44 surplus and allows to reduce the diameter of these sprockets in order to increase the revolutions. In horizontal direction, at the upper ends of posts 41 and 42, the sprocket wheels 63 and 64 are exactly opposite each other. In vertical direction, wheel 63 is exactly opposite to the right wheel of pair 43 and both are connected with a roller chain 61, in the same manner wheel 64 is opposite to the left wheel of pair 44 and both are connected with a roller chain 62. Attached to roller chains 61 and 62 are rods 65 by means of standard roller chain attachments. Each second rod 65 carries a vane 66 turnable around rod 65. This turning of vane 66 around rod 65 is controlled on the windside by pitch control arm 67 and on the leeside by pitch control arm 68, operating in the same manner as shown by FIGS. 2 and 3.

Although there has been shown and described herein two preferred forms of the invention, it is to be understood that the invention is not necessarily confined thereto and that any change in the structure and relative arrangement of compoments are contemplated as being within the scope of the invention, defined by the claims appended.

The embodiments of the invention for which protection by a patent is claimed are defined as follows:

1. A belt conveyor type windmotor, moving horizontally and consisting of two synchronized endless cables, wheels for supporting said cables, vanes attached to said cables as a belt of vanes, means for wind operated control of the pitch angle of said vanes so that said vanes are taking up the motion energy from the wind and said wheels are taking up the motion energy from said cables for transfer to a generator, wherein the improvement comprises, means for supporting and synchronizing sagged cables of said belt of vanes consisting of following structural elements in combination, sheaves of variable diameter to compensate for elongation of cables and to support said cables, notches in the grooves of said sheaves for the rods attached to the cables to prevent shifting of cables in the grooves in order to ensure synchronization, means for self-alignment of said sheaves to sagged cables so that sagged cables are running tangentially into the grooves of said sheaves, thereby reducing wear between cables and grooves.

* * * * *